(12) United States Patent
Bamji et al.

(10) Patent No.: US 8,139,142 B2
(45) Date of Patent: Mar. 20, 2012

(54) VIDEO MANIPULATION OF RED, GREEN, BLUE, DISTANCE (RGB-Z) DATA INCLUDING SEGMENTATION, UP-SAMPLING, AND BACKGROUND SUBSTITUTION TECHNIQUES

(75) Inventors: Cyrus Bamji, Fremont, CA (US); Abbas Rafii, Palo Alto, CA (US); Ryan E. Crabb, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 12/004,305

(22) Filed: Dec. 20, 2007

(65) Prior Publication Data

US 2011/0285910 A1 Nov. 24, 2011

Related U.S. Application Data

(63) Continuation-in-part of application No. 11/444,947, filed on Jun. 1, 2006.

(60) Provisional application No. 60/876,415, filed on Dec. 20, 2006.

(51) Int. Cl.
*G03B 13/00* (2006.01)
*H04N 9/07* (2006.01)
*H04N 5/225* (2006.01)
*H04N 13/02* (2006.01)
*G01C 3/08* (2006.01)

(52) U.S. Cl. .......... 348/348; 348/49; 348/335; 348/342; 356/5.01; 356/5.04

(58) Field of Classification Search .............. 348/42–60, 348/274, 275, 336, 337, 348, 349, 350; 356/5.01–5.08
See application file for complete search history.

(56) References Cited

U.S. PATENT DOCUMENTS

| 5,920,347 | A | 7/1999 | Aoki | |
|---|---|---|---|---|
| 6,856,355 | B1 | 2/2005 | Ray et al. | |
| 6,915,196 | B2 * | 7/2005 | Rao et al. | 701/45 |
| 7,129,462 | B2 | 10/2006 | Hogan et al. | |
| 7,560,679 | B1 | 7/2009 | Gutierrez | |
| 2004/0169749 | A1 * | 9/2004 | Acharya | 348/279 |
| 2004/0183940 | A1 * | 9/2004 | Raskar | 348/371 |

OTHER PUBLICATIONS

Response to Office Action filed Sep. 29, 2011, U.S. Appl. No. 11/444,947, filed Jun. 1, 2006.

(Continued)

*Primary Examiner* — David Ometz
*Assistant Examiner* — Dillon Durnford Geszvain
(74) *Attorney, Agent, or Firm* — Vierra Magen Marcus & DeNiro LLP

(57) ABSTRACT

RGB-Z imaging systems acquire RGB data typically with a high X-Y resolution RGB pixel array, and acquire Z-depth data with an array of physically larger Z pixels having additive signal properties. In each acquired frame, RGB pixels are mapped to a corresponding Z pixel. Z image resolution is enhanced by identifying Z discontinuities and identifying corresponding RGB pixels where the Z discontinuities occur. Thus segmented data enables RGB background substitution, which preferably blends foreground pixel color and substitute background color. The segmented data also enables up-sampling in which a higher XY resolution Z image with accurate Z values is obtained. Up-sampling uses an equation set enabling assignment of accurate Z values to RGB pixels. Fixed acquisition frame rates are enabled by carefully culling bad Z data. Segmenting and up-sampling enhanced video effects and enable low cost, low Z resolution arrays to function comparably to higher quality, higher resolution Z arrays.

16 Claims, 9 Drawing Sheets

OTHER PUBLICATIONS

Office Action dated Mar. 17, 2011, U.S. Appl. No. 11/044,996, filed Jan. 26, 2005.
Response to Office Action dated Jun. 17, 2011, U.S. Appl. No. 11/044,996, filed Jan. 26, 2005.
Notice of Allowance and Fee(s) Due dated Jan. 3, 2012, U.S. Appl. No. 11/444,947, filed Jun. 1, 2006.
Notice of Allowance and Fee(s) Due dated Jan. 5, 2012, U.S. Appl. No. 11/044,996, filed Jan. 26, 2005.

* cited by examiner

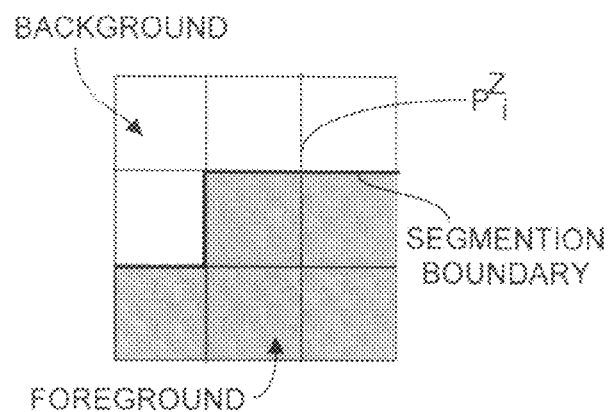
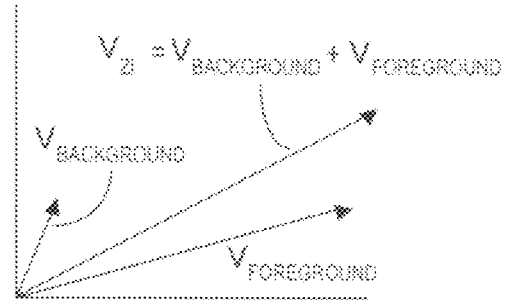
FIG. 7A    FIG. 7B
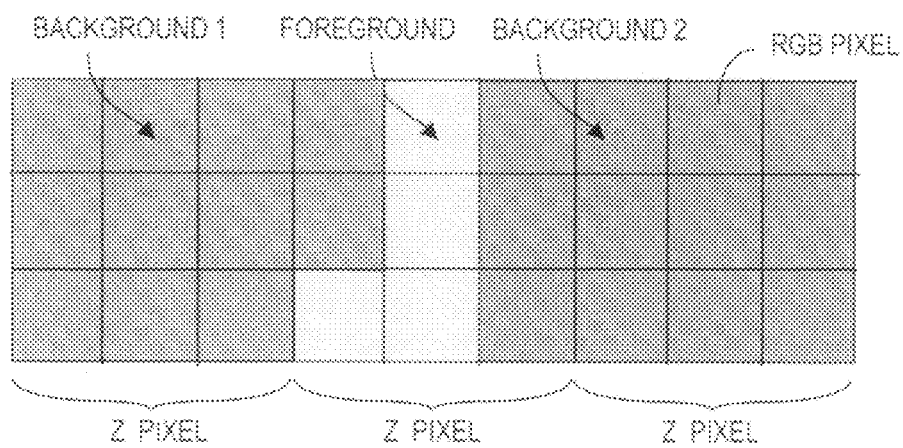
FIG. 7C

VIDEO MANIPULATION OF RED, GREEN, BLUE, DISTANCE (RGB-Z) DATA INCLUDING SEGMENTATION, UP-SAMPLING, AND BACKGROUND SUBSTITUTION TECHNIQUES

RELATION TO CO-PENDING APPLICATION

Priority is claimed from co-pending U.S. provisional patent application Ser. No. 60/876,415, filed 20 Dec. 2006, entitled "True Up-Sampling Using Red, Blue, Green (RGB) Information", and also to co-pending U.S. utility patent application Ser. No. 11/444,947, filed 1 Jun. 2006, entitled "Method and System to Increase X-Y Resolution in a Depth (Z) Camera Using Red, Blue, Green (RGB) Sensing". Each of these applications is assigned to Canesta, Inc. of Sunnyvale, Calif., assignee herein.

FIELD OF THE INVENTION

The present invention relates generally to special effects manipulation of video using red, green, blue, and depth (RGB-Z) pixel information, and more particularly to manipulation employing segmentation, up-sampling, and background substitution techniques using data so acquired.

BACKGROUND OF THE INVENTION

Manipulation of video data is often employed in producing commercial films, but is becoming increasingly more important in other applications, including video available via the Internet. One form of video manipulation is the so-called blue screen substitution, which motion picture and television producers use to create composite image special effects. For example, actors or other objects may be filmed in the foreground of a scene that includes a uniformly lit flat screen background having a pure color, typically blue (but sometimes green). A camera using conventional color film or a solid state camera with a sensor array of red, green, blue (RGB) pixels captures the entire scene. During production, the background blue is eliminated based upon its luminance characteristic, and a new backdrop substituted, perhaps a blue sky with wind blown white clouds, a herd of charging elephants, etc. If the background image to be eliminated (the blue screen) is completely known to the camera, the result is a motion picture (or still picture) of the actors in the foreground superimposed almost seamless in front of the substitute background. When done properly, the foreground images appear to superimpose over the substitute background. In general there is good granularity at the interface between the edges of the actors or objects in the foreground, and the substitute background. By good granularity it is meant that the foreground actors or objects appear to meld into the substitute background as though the actors had originally been filmed in front of the substitute background. Successful blue screen techniques require that the blue background be static, e.g., there be no discernable pattern on the blue background such that any movement of the background relative to the camera would go undetected. But the relationship between camera and background must be static for backgrounds that have a motion-discernable pattern. If this static relationship between camera and background is not met, undesired fringing can result, where perimeter portions of the foreground actors or objects appear to be traced with color(s) at the interface with the substitute background.

Blue screen composite imaging is readily implemented in a large commercial production studio, but can be costly and require a large staging facility, in addition to special processing equipment. In practice such imaging effects are typically beyond the reach of amateur video producers and still photographers.

It is also known in the art to acquire images using three-dimensional cameras to ascertain Z depth distances to a target object. Camera systems that acquire both RGB images and Z-data are frequently referred to as RGB-Z systems. With respect to systems that acquire Z-data, e.g., depth or distance information from the camera system to an object, some prior art depth camera systems approximate the distance or range to an object based upon luminosity or brightness information reflected by the object. But Z-systems that rely upon luminosity data can be confused by reflected light from a distant but shiny object, and by light from a less distant but less reflective object. Both objects can erroneously appear to be the same distance from the camera. So-called structured light systems, e.g., stereographic cameras, may be used to acquire Z-data. But in practice, such geometry based methods require high precision and are often fooled.

A more accurate class of range or Z distance systems are the so-called time-of-flight (TOF) systems, many of which have been pioneered by Canesta, Inc., assignee herein. Various aspects of TOF imaging systems are described in the following patents assigned to Canesta, Inc.: U.S. Pat. No. 7,203,356 "Subject Segmentation and Tracking Using 3D Sensing Technology for Video Compression in Multimedia Applications", U.S. Pat. No. 6,906,793 Methods and Devices for Charge Management for Three-Dimensional Sensing", and U.S. Pat. No. 6,580,496 "Systems for CMOS-Compatible Three-Dimensional Image Sensing Using Quantum Efficiency Modulation", U.S. Pat. No. 6,515,740 "Methods for CMOS-Compatible Three-Dimensional image Sensing Using Quantum Efficiency Modulation".

FIG. 1 depicts an exemplary TOF system, as described in U.S. Pat. No. 6,323,942 entitled "CMOS-Compatible Three-Dimensional Image Sensor IC" (2001), which patent is incorporated herein by reference as further background material. TOF system 10 can be implemented on a single IC 110, without moving parts and with relatively few off-chip components. System 100 includes a two-dimensional array 130 of Z pixel detectors 140, each of which has dedicated circuitry 150 for processing detection charge output by the associated detector. In a typical application, array 130 might include 100×100 pixels 140, and thus include 100×100 processing circuits 150. IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations, which may be output as DATA.

Under control of microprocessor 160, a source of optical energy 120, typical IR or NIR wavelengths, is periodically energized and emits optical energy $S_1$ via lens 125 toward an object target 20. Typically the optical energy is light, for example emitted by a laser diode or LED device 120. Some of the emitted optical energy will be reflected off the surface of target object 20 as reflected energy $S_2$. This reflected energy passes through an aperture field stop and lens, collectively 135, and will fall upon two-dimensional array 130 of pixel detectors 140 where a depth or Z image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined as part of the DATA signal that can be output elsewhere, as needed.

Emitted optical energy $S_1$ traversing to more distant surface regions of target object 20, e.g., Z3, before being reflected back toward system 100 will define a longer time-of-flight than radiation falling upon and being reflected from a nearer surface portion of the target object (or a closer target object), e.g., at distance Z1. For example the time-of-flight for optical energy to traverse the roundtrip path noted at t1 is given by t1=2·Z1/C, where C is velocity of light. TOF sensor system 10 can acquire three-dimensional images of a target object in real time, simultaneously acquiring both luminosity data (e.g., signal brightness amplitude) and true TOF distance (Z) measurements of a target object or scene. Most of the Z pixel detectors in Canesta-type TOF systems have additive signal properties in that each individual pixel acquires vector data in the form of luminosity information and also in the form of Z distance information. While the system of FIG. 1 can measure Z, the nature of Z detection according to the first described embodiment of the '942 patent does not lend itself to use with the present invention because the Z-pixel detectors do not exhibit a signal additive characteristic. A more useful class of TOF sensor systems whose Z-detection does exhibit a signal additive characteristic are so-called phase-sensing TOF systems. Most current Canesta, Inc. Z-pixel detectors operate with this characteristic.

Many Canesta, Inc. systems determine TOF and construct a depth image by examining relative phase shift between the transmitted light signals $S_1$ having a known phase, and signals $S_2$ reflected from the target object. Exemplary such phase-type TOF systems are described in several U.S. patents assigned to Canesta, Inc., assignee herein, including U.S. Pat. Nos. 6,515,740 "Methods for CMOS-Compatible Three-Dimensional Imaging Sensing Using Quantum Efficiency Modulation", 6,906,793 entitled Methods and Devices for Charge Management for Three Dimensional Sensing, 6,678,039 "Method and System to Enhance Dynamic Range Conversion Useable With CMOS Three-Dimensional Imaging", 6,587,186 "CMOS-Compatible Three-Dimensional Image Sensing Using Reduced Peak Energy", 6,580,496 "Systems for CMOS-Compatible Three-Dimensional Image Sensing Using Quantum Efficiency Modulation".

FIG. 2A is based upon above-noted U.S. Pat. No. 6,906,793 and depicts an exemplary phase-type TOF system in which phase shift between emitted and detected signals, respectively, $S_1$ and $S_2$ provides a measure of distance Z to target object 20. Under control of microprocessor 160, optical energy source 120 is periodically energized by an exciter 115, and emits output modulated optical energy $S_1=S_{out}=\cos(\omega t)$ having a known phase towards object target 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms).

Some of the emitted optical energy (denoted $S_{out}$) will be reflected (denoted $S_2=S_{in}$) off the surface of target object 20, and will pass through aperture field stop and lens, collectively 135, and will fall upon two-dimensional array 130 of pixel or photodetectors 140. When reflected optical energy $S_{in}$ impinges upon photodetectors 140 in array 130, photons within the photodetectors are released, and converted into tiny amounts of detection current. For ease of explanation, incoming optical energy may be modeled as $S_{in}=A \cdot \cos(\omega \cdot t+\theta)$, where A is a brightness or intensity coefficient, $\omega \cdot t$ represents the periodic modulation frequency, and $\theta$ is phase shift. As distance Z changes, phase shift $\theta$ changes, and FIGS. 2B and 2C depict a phase shift $\theta$ between emitted and detected signals, $S_1$, $S_2$. The phase shift $\theta$ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data.

In preferred embodiments, pixel detection information is captured at least two discrete phases, preferably 0° and 90°, and is processed to yield Z data.

System 100 yields a phase shift $\theta$ at distance Z due to time-of-flight given by:

$$\theta=2 \cdot \omega \cdot Z/C=2 \cdot (2 \cdot \pi \cdot f) \cdot Z/C \qquad (1)$$

where C is the speed of light, 300,000 Km/sec. From equation (1) above it follows that distance Z is given by:

$$Z=\theta \cdot C/2 \cdot \omega=\theta \cdot C/(2 \cdot 2 \cdot f \cdot \pi) \qquad (2)$$

And when $\theta=2 \cdot \pi$, the aliasing interval range associated with modulation frequency f is given as:

$$Z_{AIR}=C/(2 \cdot f) \qquad (3)$$

In practice, changes in Z produce change in phase shift $\theta$ although eventually the phase shift begins to repeat, e.g., $\theta=\theta+2 \cdot \pi$, etc. Thus, distance Z is known modulo $2 \cdot \pi \cdot C/2 \cdot \omega)=C/2 \cdot f$, where f is the modulation frequency.

Canesta, Inc. has also developed a so-called RGB-Z sensor system, a system that simultaneously acquires both red, green, blue visible data, and Z depth data. FIG. 3 is taken from Canesta U.S. patent application Ser. No. 11/044,996, publication no. US 2005/0285966, entitled "Single Chip Red, Green, Blue, Distance (RGB-Z) Sensor". FIG. 3A is taken from Canesta's above-noted '966 publication and discloses an RGB-Z system 100'. System 100' includes an RGB-Z sensor 110 having an array 230 of Z pixel detectors, and an array 230' of RGB detectors. Other embodiments of system 100' may implement an RGB-Z sensor comprising interspersed RGB and Z pixels on a single substrate. In FIG. 3A, sensor 110 preferably includes optically transparent structures 220 and 240 receive incoming optical energy via lens 135, and split the energy into IR-NIR or Z components and RGB components. In FIG. 3A, the incoming IR-NIR Z components of optical energy S2 are directed upward for detection by Z pixel array 230, while the incoming RGB optical components pass through for detection by RGB pixel array 230'. Detected RGB data may be processed by circuitry 265 to produce an RGB image on a display 70, while Z data is coupled to an omnibus block 235 that may be understood to include elements 160, 170, 180, 290, 115 from FIG. 2A.

System 100' in FIG. 3A can thus simultaneously acquire an RGB image, preferably viewable on display 70. FIG. 3A depicts an exemplary RGB-Z system 100', as described in the above-noted Canesta '966 publication. While the embodiment shown in FIG. 3A uses a single lens 135 to focus incoming IR-NIR and RGB optical energy, other embodiments depicted in the Canesta '966 disclosure use a first lens to focus incoming IR-NIR energy, and a second lens, closely spaced near the first lens, to focus incoming RGB optical energy. Referring to FIG. 3A, system 100' includes an RGB-Z sensor 110 having an array 230 of Z pixel detectors 240, and an array 230' of RGB detectors 240'. Other embodiments of system 100' may implement an RGB-Z sensor comprising interspersed RGB and Z pixels on a single substrate. In FIG. 3A, sensor 110 preferably includes optically transparent structures 220 and 240 receive incoming optical energy via lens 135, and split the energy into IR-NIR or Z components and RGB components. In FIG. 3A, the incoming IR-NIR Z components of optical energy S2 are directed upward for detection by Z pixel array 230, while the incoming RGB optical components pass through for detection by RGB pixel array 230'. Detected RGB data may be processed by circuitry 265 to produce an RGB image on a display 70, while Z data is coupled to an omnibus block 235 that may be understood to include elements 160, 170, 180, 290, 115 from FIG. 2A.

FIG. 3B depicts a single Z pixel 240, while FIG. 3C depicts a group of RGB pixels 240'. While FIGS. 3B and 3C are not to scale, in practice the area of a single Z pixel is substantially greater than the area of an individual RGB pixel. Exemplary sizes might be 15 μm×15 μm for a Z pixel, and perhaps 4 μm×4 μm for an RGB pixel. Thus, the resolution or granularity for information acquired by RGB pixels is substantially better than information acquired by Z pixels. This disparity in resolution characteristics substantially affects the ability of RGB-Z system to be used successfully to provide video effects.

FIG. 4A is a grayscale version of an image acquired with an RGB-Z system, and shows an object 20 that is a person whose right arm is held in front of the person's chest. Let everything that is "not" the person be deemed background 20'. Of course the problem is to accurately discern where the edges of the person in the foreground are relative to the background. Arrow 250 denotes a region of the forearm, a tiny portion of which is shown at the Z pixel level in FIG. 4B. The diagonal line in FIG. 4B represents the boundary between the background (to the left of the diagonal line), and an upper portion of the person's arm, shown shaded to the right of the diagonal line. FIG. 4B represents many RGB pixels, and fewer Z pixels. One Z pixel is outlined in phantom, and the area of the one Z pixel encompasses nine smaller RGB pixels, denoted RGB1, RGB2, ... RGB9.

In FIG. 4B, each RGB pixel will represent a color. For example if the person is wearing a red sweater, RGB3, RGB5, RGB6, RGB8, RGB9 should each be red. RGB1 appears to be nearly all background and should be colored with whatever the background is. But what color should RGB pixels RGB2, RGB4, RGB7 be? Each of these pixels shares the same Z value as any of RGB1, RGB2, ... RGB9. If the diagonal line drawn is precisely the boundary between foreground and background, then RGB1 should be colored mostly with background, with a small contribution of foreground color. By the same token, RGB7 should be colored mostly with foreground, with a small contribution of background color. RGB4 and RGB2 should be fractionally colored about 50% with background and 50% with foreground color. But the problem is knowing where the boundary line should be drawn. Unfortunately prior art techniques make it difficult to intelligently identify the boundary line, and the result can be a zig-zag boundary on the perimeter of the foreground object, rather than a seamlessly smooth boundary. If a background substitution effect were to be employed, the result could be a foreground object that has a visibly jagged perimeter, an effect that would not look realistic to a viewer.

Thus there is a need for video processing techniques that can employ relatively inexpensive arrays of RGB and Z pixels, and provide video manipulation generally associated with high quality, and greater density arrays. Further there is a need for such techniques that operate well in the real world, even if some Z data is erroneous or not present. Finally, such techniques should operate substantially in real time.

The present invention provides such techniques for manipulating RGB-Z data, including segmentation, up-sampling, and background substitution.

SUMMARY OF THE INVENTION

Some embodiments of the present invention utilize the additive signal properties associated with time-of-flight (TOF) sensors that simultaneously acquire brightness data and depth (Z) data using phase detection or detection integration. Using enhanced segmenting and up-sampling techniques, embodiments of the present invention compensate for the inferior granularity (so-called X-Y or spatial resolution) of Z-pixel acquired data, compared to RGB pixel acquired data. These embodiments enable superior video processing techniques, including robust background substitution. These embodiments also enable applications that require high X-Y depth resolution and accurate Z data, not otherwise possible using the low X-Y resolution Z data from the Z-sensors. Finally, embodiments of the present invention are applicable to improving Z resolution available from Z-pixels, sometimes even in the absence of RGB data.

In an RGB-Z system, granularity of the RGB pixels is substantially better than that of the Z pixels, and up-sampling is employed to correctly assign a depth Z value to each RGB pixel in an acquired image. One aspect of the present invention recognizes that proper up-sampling is tantamount to simultaneously satisfying a linear additive constraint and smoothness cost constraint. The additive constraint may be satisfied by providing Z pixel sensors with signal additive properties such that the response of a Z pixel is the sum of the responses of the associated RGB pixels. The smoothness cost constraint is satisfied by minimizing object surface discontinuities preferably smaller than a discontinuity threshold. Up-sampling according to the present invention enables low cost, relatively low granularity Z-pixel arrays in an RGB-Z system to outperform higher cost, higher granularity arrays in other systems, and to do so with substantially less processing time and processing overhead.

Embodiments of the present invention function well even with RGB-Z camera-background relationships that are dynamic rather than static, and can function well even if some Z data is erroneous or even missing. Acquired Z data that is determined or suspected to be inaccurate is intelligently culled. The high spatial (e.g., X-Y) resolution RGB pixel data and the lower X-Y resolution Z pixel depth data are combined, and higher X-Y resolution Z depth estimates are achieved. Signal processing can occur substantially in real time, or within a fixed time bound, using a dynamic algorithm.

Aspects of the present invention provide an enhanced Z depth estimate for each pixel in an RGB pixel array. As a result, video effects such as background substitution can be implemented rapidly, at low cost, with natural appearing RGB images. RGB-Z systems according to the present invention are CMOS-mass producible, which contributes to the low cost of enhanced video effects enabled by embodiments of the present invention.

Other features and advantages of the invention will appear from the following description in which the preferred embodiments have been set forth in detail, in conjunction with the accompany drawings.

BRIEF DESCRIPTION OF THE DRAWINGS

FIG. 7A depicts a signal additive Z pixel and small RGB pixels, showing the segmentation boundary, according to an embodiment of the present invention;

FIG. 7B is a phase-amplitude plot showing the associated signals detected by the Z pixel in FIG. 7A, according to an embodiment of the present invention;

FIG. 7C depicts segmentation applied to a group of three Z pixels and twenty-seven RGB pixels comprising two background regions and one foreground region, according to an embodiment of the present invention;

DETAILED DESCRIPTION OF THE PREFERRED EMBODIMENTS

Figure 1:
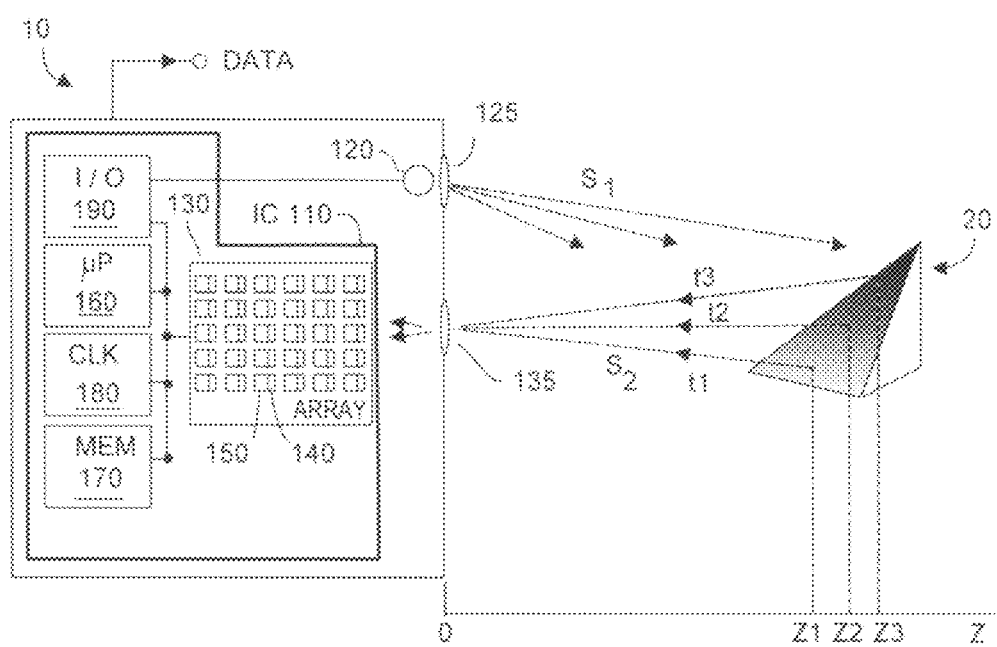
FIG. 1 depicts a time-of-flight (TOF) range finding system, according to the prior art.
Figure 2A:
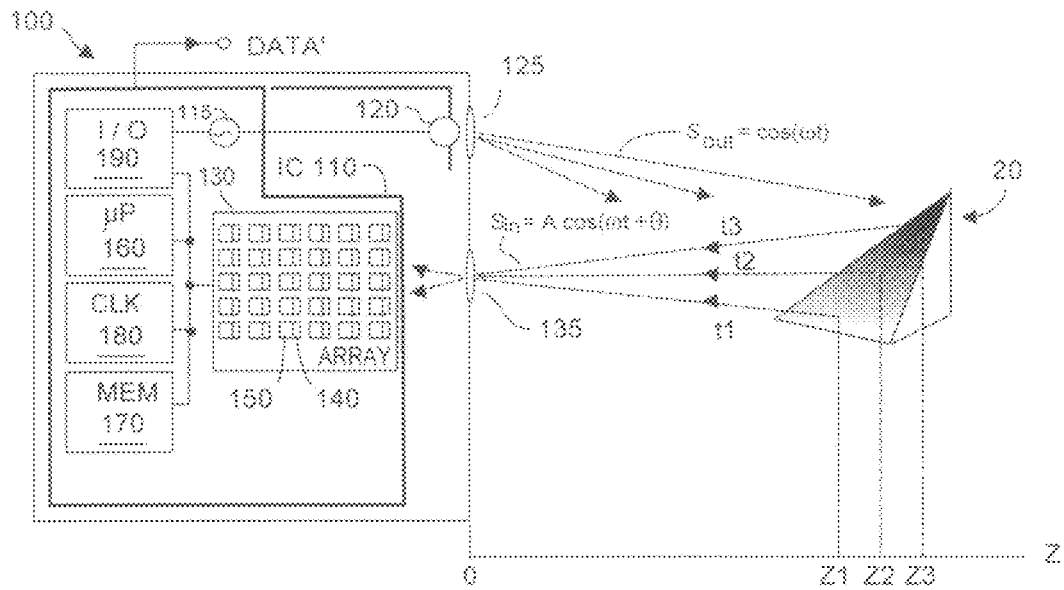
FIG. 2A depicts a phase-based TOF range finding system whose Z-pixels exhibit additive signal properties, according to the prior art.
Figure 2B:
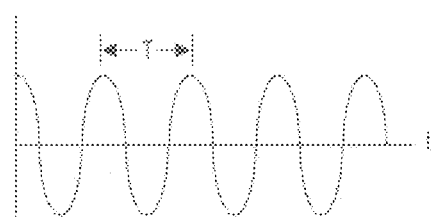
FIGS. 2B and 2C depict phase-shifted signals associated with the TOF range finding system of FIG. 2A, according to the prior art.
Figure 2C:
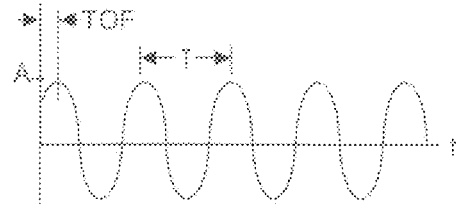
Figure 3A:
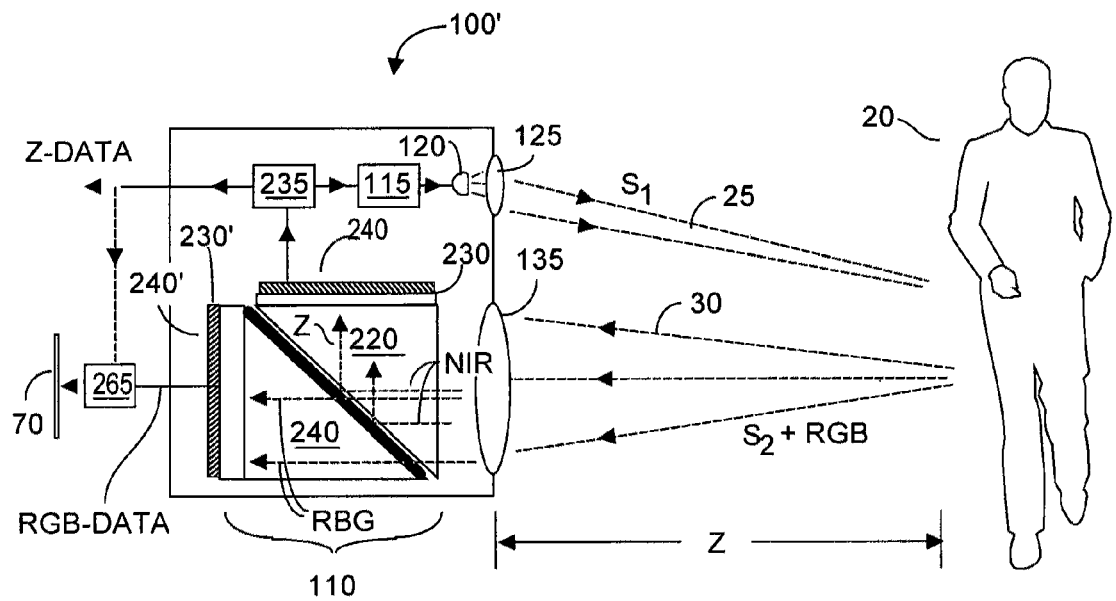
FIG. 3A depicts an omnibus RGB-Z range finding system, according to Canesta, Inc.'s published co-pending patent application US 2005/0285966.
Figure 3B:
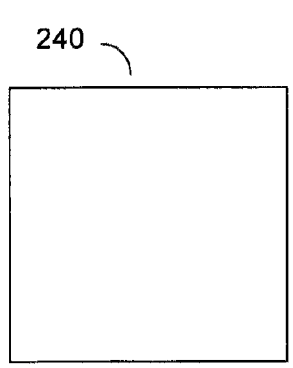
FIGS. 3B and 3C depict respectively the large area and relatively small area associated with Z pixels, and with RGB pixels.
Figure 5:
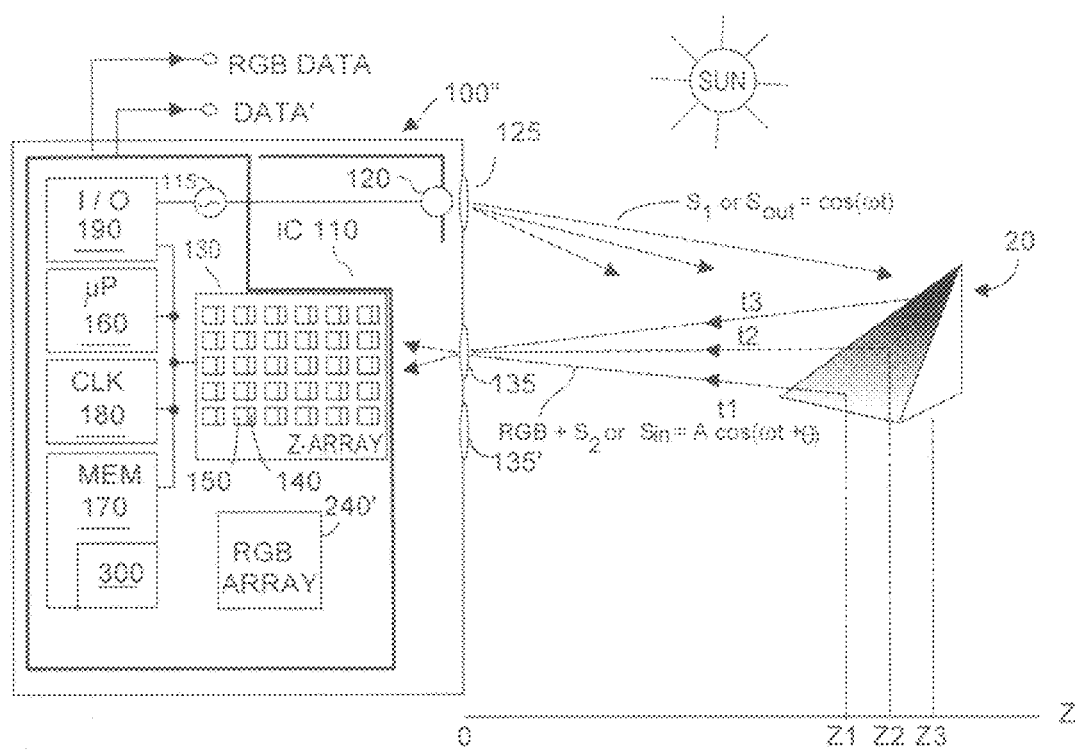
FIG. 5 depicts an omnibus RGB-Z imaging system, according to embodiments of the present invention.

Aspects of the present invention may be practiced with image acquisition systems that acquire only Z data, and/or RGB data. In embodiments where RGB and Z data are used, the system that acquires RGB data need not be part of the system that detects Z data. FIG. 5 depicts an omnibus RGB-Z system 100" that combines TOF functionality with linear additive signal Z pixels as described with respect to FIG. 2A herein, with RGB and Z functionality as described with respect to FIG. 3A herein. In its broadest sense, RGB-Z system 100" includes an array 130 of Z pixels 140, and includes an array 240' of RGB pixels. It is understood that array 130 and array 240' may be formed on separate substrates, or that a single substrate containing arrays of linear additive Z pixels and RGB pixels may be used. It is also noted that a separate lens 135' may be used to focus incoming RGB optical energy. Memory 170 may be similar to that in FIG. 2A, and in the embodiment of FIG. 5, preferably stores a software routine 300 that when executed, by processor 160 or other processing resource (not shown) carries out algorithms implementing the various aspects of the present invention. System 100" may be deployed in a motor vehicle to image regions about the vehicle to better protect the vehicle and occupants against danger from collision and the like. It is understood that while system 100" responds to reflected IR-NIR optical energy in determining Z, that ambient light such as the sun typically suffices as a source of visible RGB optical energy that is detected by RGB array 240'. Of course system 100" could include an active source of RGB optical energy. Overall, system 100" preferably can be fabricated using mass production CMOS technology, and indeed much of the system can be fabricated on a single IC 110.

Aspects of the present invention provide up-sampling, which is one sense implies the effective use of more pixel data than may actually have been provided by an RGB-Z system. More generally, however, up-sampling can also include the smoothing of data, carried out without necessarily producing more data samples. Up-sampling seeks to assign to each RGB pixel a Z-depth value that is compatible with neighboring RGB pixels. This task is somewhat compounded by the fact that Z-pixels can be ten times larger than RGB pixels, and thus exhibit substantially less granularity. Many neighboring RGB pixels may share a common Z-pixel, yet some of the RGB pixels may be foreground and others background. The challenge then is how best then to assign colors to RGB pixels that happen to be on the boundary between foreground and background and/or how best to refine Z depth estimate for such pixels.

But before up-sampling can be effectively applied, aspects of the present invention first employ segmenting. As used herein, segmenting is a process of determining where Z discontinuities exist, for example at the boundary of a foreground object and the background. On one hand, segmenting can be carried out using a priori techniques by which so-called alpha ($\alpha$) values or Z-plane numbers can be assigned to regions of a scene. This alpha assignment can be based upon probabilities such that groups of pixels or zones of RGB pixels appearing to share close Z values are identified as probably being foreground or background, or some intermediate percentage of foreground and background color. For example, $\alpha=0$ can denote pure background, and $\alpha=1$ can denote pure foreground, with intermediate fractional values of $\alpha$ denoting pixels with a mixture of foreground and background colors. Another approach to segmentation does not attempt to guess at what is probably foreground and what is probably background, but instead looks at data analysis, and then makes alpha-type assignments. Using either segmentation approach, regions of Z-discontinuity are identified.

Once planes of Z-discontinuity (or alpha values) are identified, video processing techniques such as background substitution can be implemented by replacing one or more Z-planes with different streams of RGB data. Understandably blend-in problems can arise at the periphery or boundary between foreground and background. In these boundary zones, it is desirable to intelligently partially color RGB pixels with a mixture of foreground and background color, so as to make a user-viewable RGB image appear to more natural, with minimal zig-zag edges.

In its various embodiments, the present invention preferably is carried out by executing software algorithms or methods that can be stored as routine(s) 300 in memory, e.g., memory 300 in omnibus system 100" (see FIG. 5). These routines are executed by a processor, perhaps processor 160 in system 100" to implement segmentation, up-sampling, background substitution, etc., according to the present invention.

One aspect of the present invention provides a form of data up-sampling, useful in many applications, especially for RGB-Z sensing systems that typically have more RGB pixels than Z pixels, because of the relative difference in the size of the two types of pixels. Up-sampling is a method to correctly assign a depth Z value to each RGB pixel in an acquired image. Proper up-sampling requires satisfying two constraints: an additive constraint and a smoothness cost constraint. The additive constraint is tantamount to providing sensors such that the response of a Z pixel is the sum of the responses corresponding to all objects in its field of view (FOV). The FOV of a Z pixel is substantially the sum of the FOV of all the associated RGB pixels. Thus, if the response of each RGB pixel is assumed to be that of a (small) Z pixel having the RGB FOV, then the response of the Z pixel is the sum of the responses of the associated RGB pixels. The second constraint that must be satisfied is a smoothness cost constraint that minimizes discontinuities smaller than a threshold on a surface of an object. The present invention recognizes that proper up-sampling is equivalent to solving the additive and the smoothness cost constraints.

According to some embodiments of the present invention, up-sampling assumes the acquired image has been segmented, e.g., that an approximate boundary between foreground and background has been ascertained, and that each RGB pixel has been assigned to a depth layer or plane. For example in a portrait of a subject, RGB pixels corresponding to the subject may be assigned to a so called foreground plane, and RGB pixels representing image behind the subject may be assigned a so called background plane. In this embodiment, the dividing boundaries for transitions between different depth planes is also provided using segmentation.

Figure 6A:
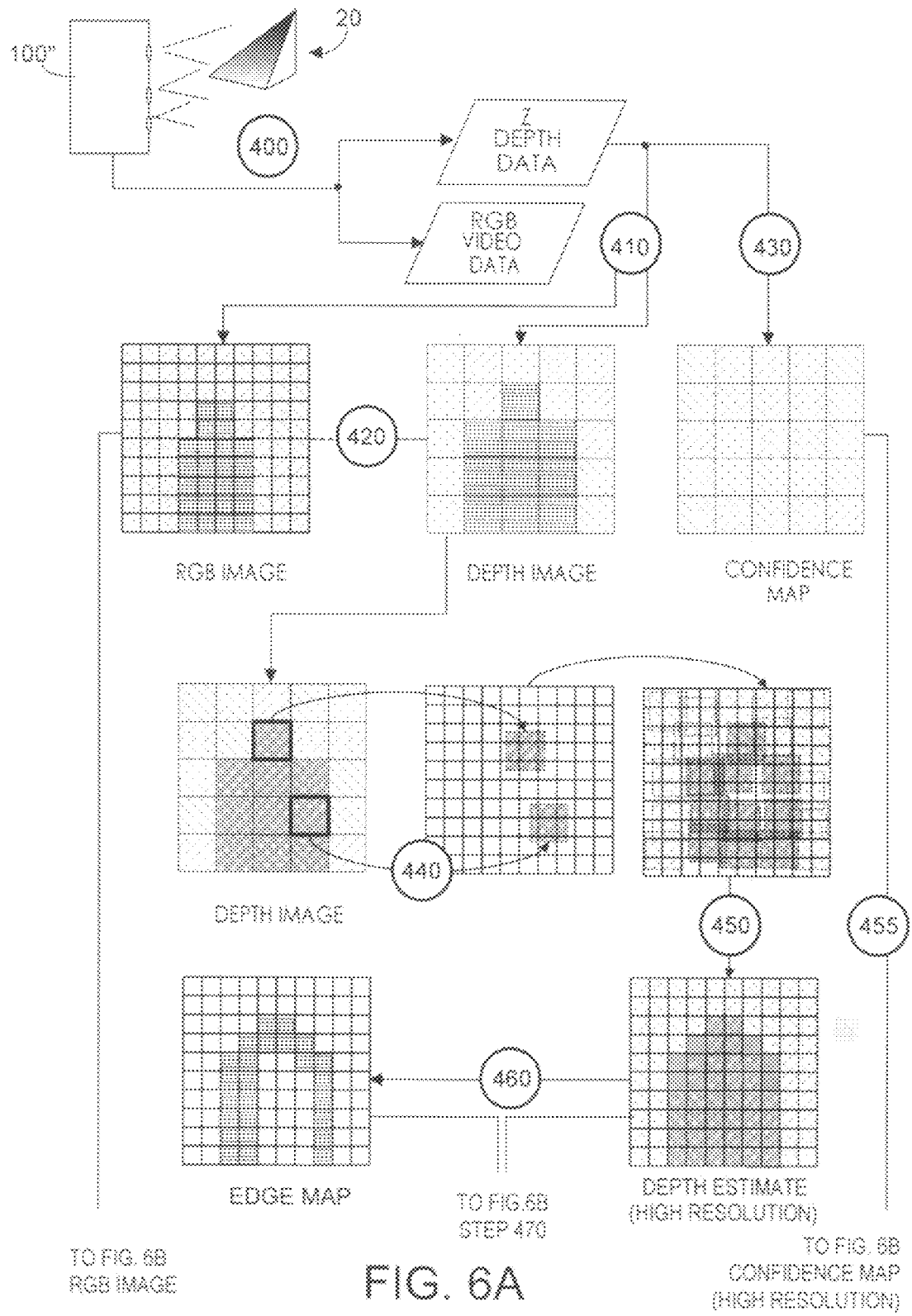
FIG. 6A, 6B is a flow chart depicting various aspects of signal processing useful to background substitution, according to embodiments of the present invention.
Figure 6B:
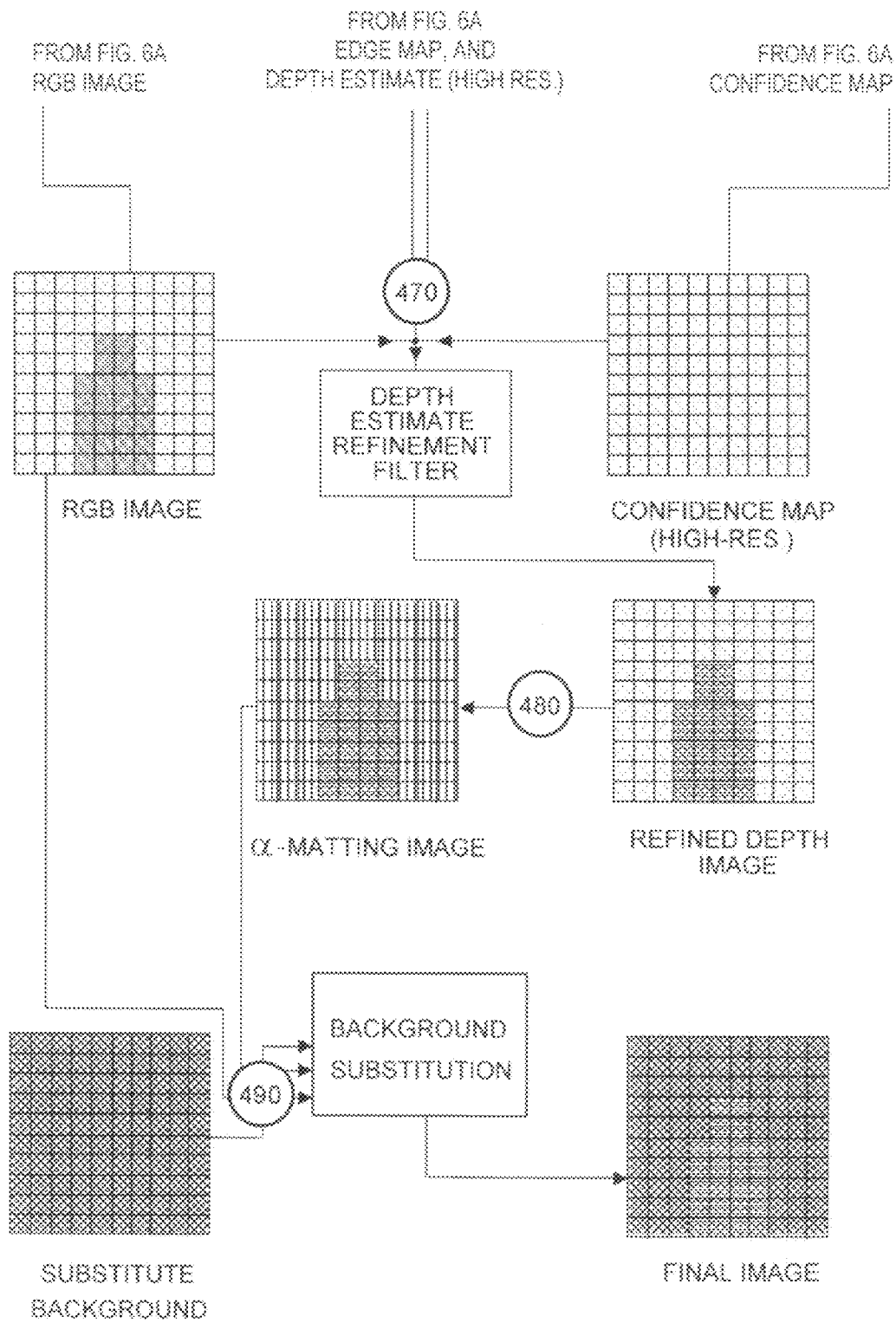

FIG. 6A, 6B is a flow chart depicting exemplary segmenting process steps, preferably carried out when software routine 300 in FIG. 5 is executed. In FIG. 6A, 6B, let it be assumed that RGB and Z data is obtained by a system such as system 100" shown in FIG. 5. At method step 400, the system acquires sequences of RGB color video images, and also acquires Z depth data, which acquisition captures may occur at different frame rates. In step 410, the most current Z depth image is acquired from the captured sequence, and is synced to the corresponding RGB video frame. Alternately, hardware synchronization can be used to ensure the RGB sensors and the Z sensors output frames of data in a synchronized fashion, e.g., one frame of RGB for every two frames of Z. At method step 420, Z-pixels in the depth image are registered or bound to locations in the corresponding RGB image. As noted, Z pixels are substantially larger than RGB pixels, and each Z-pixel $P^Z_i$ is assigned a position in the RGB image plane, estimated to an accuracy of about 10% of a pixel in the RGB image plane. Step 420 essentially means that RGB pixels corresponding to the field of view (FOV) of a Z pixel are identified. As such techniques are known in the art, a detailed description of the registration of Z-pixels to the RGB image plane will not be given herein. The mapped location of the pixel in the RGB image plane is denoted herein as $P^{RGB}(P^Z_i)$. This mapping of low resolution Z-pixels to high resolution RGB pixels is sometimes referred to as a flow field.

At method step 430, for each Z-pixel a confidence map is created, i.e., a map that is an estimation of the confidence of the Z depth measurement for that pixel. A measure for this confidence can be reasonably achieved in several ways. For example, the observed active brightness measured by the Z pixel can be used. Brightness (or intensity) is represented by the coefficient A in the expression for the detected optical energy $S_{in}=A \cdot \cos(\omega \cdot t + \theta)$ reflected by a target object in a scene. It will be recalled that $\omega \cdot t$ is periodic modulation frequency, and $\theta$ is phase shift, which changes with Z. For each Z-pixel $P^Z_i$, the brightness coefficient can be denoted as $AB(P^Z_i)$. The confidence for a pixel can be represented by the proportion of the measured brightness to the maximum brightness measured in the scene. Specifically, let the definition of confidence of pixel $P^Z_i$ be given by $C(P^Z_i)=AB(P^Z_i)/\max(AB(P^Z_j))$, for all Z-pixels $P^Z_j$ in the Z-image. It should be noted that a step function could be applied to the confidence map such that if the confidence of any Z-pixel is too low, its confidence is simply dropped to zero. Thus, any Z-pixels with sufficient confidence values will be weighted equally. Alternatively, the confidence map could be multiplied by its response to the step function, such that low-confidence pixels are weighted zero, while remaining pixels retain their relative confidence score. In such a fashion, erroneous or missing Z data can be readily culled rather than processed.

At method step 440 in FIG. 6A, each Z-pixel is mapped to its location in the RGB image plane. Such mapping is a form of associating a Z pixel with a collection of associated RGB pixels that encompass the FOV of the Z pixel. As noted, RBG and Z pixels will not necessarily line up exactly, and not every pixel in the RGB image plane may be covered. Thus mapping according to the present invention may be dynamic, e.g., recomputable at each frame based upon distance, rather than static. Such dynamic associations are necessary when the Z and RGB data are captured with different lenses.

At method step 450, a coarse Z depth estimate image is created in the same resolution as the RGB image. Each RGB pixel is assigned a reasonably accurate Z depth estimate. The coarse depth estimate for pixel $P^{RGB}_i$ is denoted $\check{Z}_D(P^{RGB}_i)$. The resulting set of depth estimates is an interpolation of the points mapped in step 440. Aspects of step 450 may be carried out in a variety of ways, known to those skilled in the art. One embodiment employs a Gaussian weighted-average based method, which method may be stored as part of routine 300 for execution by processor 160 or other processor (see FIG. 5). The method uses points $P^{RGB}(P^Z_i)$ in the neighborhood of $P^{RGB}_i$, as mapped in step 440, using the distance in the RGB plane between the point $P^{RGB}_i$ and each of the neighboring points.

Let the Gaussian function be denoted in the standard notation $N(x,\delta)$, x being the center of the distribution and $\delta$ being the standard deviation. In an embodiment, the value of $\delta$ preferably is twice the ratio of the size of an RGB pixel to the size of a Z pixel, although other reasonable values for could be used.

The values used in the averaging are those of the Z pixels which are mapped to locations $P^{RGB}(P^Z_i)$ within a set-pixel window of the RGB pixel $P^{RGB}_i$ and the set of these pixels is denoted $\text{neigh}(P^{RGB}_i)$. Without loss of generality, a seven-pixel window is used, pixels being defined in the RGB space. Recall each point $P^{RGB}(P^Z_i)$ is associated with a depth estimate $Z_i$. The function for estimating the depth $\check{Z}_D(P^{RGB}_i)$ may be defined as:

$$\frac{\sum_{P^{RGB}(Z_i) \in neigh(P^{RGB}_i)} N(|P^{RGB}_i - P^{RGB}(Z_i)|, \sigma) \cdot Z_i}{\sum_{P^{RGB}(Z_i) \in neigh(P^{RGB}_i)} N(|P^{RGB}_i - P^{RGB}(Z_i)|, \sigma)}.$$

At step 455 a confidence map is created that assigns to each pixel $P^{RGB}_i$ a confidence $C(P^{RGB}_i)$, which describes the confidence of depth estimate $\check{Z}(P^{RGB}_i)$. The process for obtaining the confidence estimates follows that of the interpolation process of depth estimates in step 450. Again, recall each point $P^{RGB}(P^Z_i)$ is associated with a confidence estimate $C(P^Z_i)$. A function for estimating the confidence of an RGB pixel $C(P^{RGB}_i)$ may be defined as:

$$\frac{\sum_{P^{RGB}(Z_i) \in neigh(P_i^{RGB})} N(|P_i^{RGB} - P^{RGB}(Z_i)|, \sigma) \cdot C(P_i^Z)}{\sum_{P^{RGB}(Z_i) \in neigh(P_i^{RGB})} N(|P_i^{RGB} - P^{RGB}(Z_i)|, \sigma)}$$

By applying the coarse estimate function to every RGB pixel, one has for any RGB pixel $P^{RGB}_i$ characteristic information for the pixel's color, spatial location in the pixel array, coarse depth estimate, and confidence. Hereafter, the original Z-image and its associated confidence no longer are needed, and any reference to a characteristic such as color, spatial location, depth and confidence is to a characteristic of an RGB-pixel. Thus for a pixel $P^{RGB}_i$ there are characteristics $<R_i, G_i, B_i, X_i, Y_i, \check{Z}_i, C_i>$ At step 460, an edge map is created by labeling each RGB-pixel as being on an edge or not being on an edge. A pixel is declared to be an edge based upon the local smoothness of its depth surface. In one embodiment, the variance of the depth values in a set-size neighborhood of the pixel is computed. If the variance is above a desired threshold, the RGB pixel is labeled as an edge pixel. The collection of such label declarations is the edge map.

Embodiments of the present invention are especially useful for background substitution, which in the prior art results from refined depth estimates for every pixel using a common filter for each pixel, before applying the substitution. Unfortunately this prior art method precludes real-time use of the refinement function. By contrast, embodiments of the present invention algorithmically apply refinement to only a subset of the RGB pixels, to produce the same substitution in real-time.

Embodiments of the present invention use coarse depth estimates in conjunction with the RGB image and the confidence map to construct a refined depth image at method step 470 in FIG. 6B. According to the edge map, depth pixels that are considered edges are highly refined, preferably using a modified bilateral filter. Bilateral filtering tends to require substantial computation time and will use input from all three sources, RGB, Z, and confidence. Those pixels not considered edges are also refined, preferably with a low-computation time method, such as a median filter or a box filter, using only the Z information. The result is the up-sampled depth estimate.

The refined estimate provides a value that can resolve ambiguities caused by imprecise depth measurements (relative to color measurements) with a general notion of clustering pixels which are already near each other in the joint-space of color and spatial location (X, Y, and Z). It will be the case that for some adjacent edge pixels $P^{RGB}_i$ and $P^{RGB}_j$, the depth estimates $\check{Z}_i$ and $\check{Z}_j$ will contain similar values where a true depth discontinuity is present. Applicants' refinement method will provide more accurate depth estimates by use of RGB (color) information, thus inserting a true discontinuity where one was not indicated.

The refined depth value for an edge pixel $P^{RGB}_i$ preferably is the result of a higher computation-time function of the characteristics $<R, G, B, X, Y, \check{Z}, C>$ for that pixel, and neighboring pixels centered on that pixel. The size of the neighboring pixels window can be decided dynamically, the trade-off being better interpolation results for a larger window, but at the cost of longer computation time.

For a fixed size window, computation time for a refined depth value of a single pixel is also fixed. How much computation time will be dependant upon the speciation of processor 160 (or other processing resource), but once determined will be equivalent for all pixels. Thus, given a desired frame rate, once the number of edge pixels to be refined is decided, the appropriate window size is applied for all edge pixels.

In one embodiment, the depth refinement function is a modified so-called bilateral filter, a filter type known in the art. Each pixel is filtered with its neighboring pixels in the specified window size using a weighted Gaussian function. The Gaussian distribution preferably is defined in the $<R, G, B, X, Y, \check{Z}>$ dimensions and is weighted by C. The Gaussian distribution is defined by the center, deemed to be location of pixel $P^{RGB}_i$ for that pixel's filter, and by a standard deviation that is set to 10% the range of values for each dimension. Thus the weight of neighboring pixels is determined by the disparity in color and spatial characteristics of the pixels. For example, in one exemplary implementation, the values of R are defined to range from [0-255], and the standard deviation is set to 25.5. It is understood that this disparity may be visualized as a three-dimensional disparity vector having R, G, and B components.

Let the Gaussian function for a dimension labeled (for example) R be denoted as $G(R_i, R_0, \delta_R)$, where $R_0$ is the center of the Gaussian distribution, and $\delta_R$ is the standard deviation. For simplicity and ease of representation, the function will be denoted as $M_R(R_i)$, where it is assumed that distribution center $R_0$ is the value of the pixel on which the function is being applied, in other words the center pixel of the filter window. The value $\delta$ for the characteristic (in this example, the red color intensity R) is set as defined as immediately above. Consider the indices of pixels in the neighborhood of pixel $P^{RGB}_i$ as j be defined as neigh(i). The refined value for a pixel $P^{RGB}_i$ can be defined as:

$$\frac{\sum_{j \in neigh(i)} M_R(R_j) M_G(G_j) M_B(B_j) M_X(X_j) M_Y(Y_j) M_Z(Z_j) C_j \check{Z}_j}{\sum_{j \in neigh(i)} M_R(R_j) M_G(G_j) M_B(B_j) M_X(X_j) M_Y(Y_j) M_Z(Z_j) C_j}$$

At step 480 in FIG. 6A, each RGB-pixel is assigned a value termed the α-value, a value that designates what portion a of the pixel is considered to be foreground. Pixels with an α-value of 0 are assigned the value of the corresponding pixel in the background substitution image; pixels with an α-value of 1 are assigned the value of the corresponding pixel in the original RGB-image, and pixels with an α-value between 0 and 1 are assigned a value linearly interpolated from color values from both the original and substitute background images. The collection of values is called the α-matting image.

In the simplest formulation, alpha can take only values {0,1}, where each pixel is deemed to be entirely foreground or background. However this approach creates harsh boundaries and does not create a substitution that appears natural. For example, the perimeter of a foreground object might have a zig-zag rather than a smooth edge. One approach is to define a threshold value and margin value, which values may be user-provided, or determined algorithmically. (How these values are arrived at is not important to the present invention.) The threshold and margin define the depth at which pixels are considered foreground rather than background. In one implementation, pixels that are closer than the threshold minus half the margin are deemed foreground ($\alpha=1$), and pixels that are further than the threshold plus half the margin are deemed background ($\alpha=0$). For pixels within the margin, the $\alpha$-value is equal to the portion of the margin in which it lies. For a pixel $P^{RGB}_i$ the associated $\alpha$-value is denoted as $\alpha(P^{RGB}_i)$.

In method step 490, an appropriate new substitute background image is provided, and a final image is created. The final image takes pixels from the original RGB image and substitutes the new background image for the old background, and combines RGB and new background data as dictated by the $\alpha$-map. The substitute background image is assumed to be of the same resolution of the RGB image, so there is a one-to-one pixel association. For a pixel $P^{RGB}_i$ the associated substitution pixel, which consists of RGB values, is denoted as $B^{RGB}(P^{RGB}_i)$. The RGB values for the pixel $P^{RGB}_i$ are denoted $F^{RGB}(P^{RGB}_i)$. The resulting RGB value for each pixel in the final substitution result is $F^{RGB}(P^{RGB}_i) \times \alpha (P^{RGB}_i) + B^{RGB}(P^{RGB}_i) \times (1-\alpha(P^{RGB}_i))$.

The present invention assumes that each Z pixel $P^Z_i$ is associated with a set of RGB pixels $RGB(P^Z_i)$. This association may be static or dynamic in that it may be recomputed at each frame of acquired data, based on Z distances. Such dynamic associations are necessary in RGB-Z system in which Z and RGB data are captured using different lenses that are presumed to be close together, e.g., to have a preferably small separation distance.

The response of a Z pixel $P^Z_i$ is a vector denoted by $R(P^Z_i)$, and the response of an RGB pixel $P^{RGB}_i$ is a vector denoted by $R(P^{RGB}_i)$. Alternately these responses may be thought of as complex numbers instead of vectors. In the within application, the response of a pixel may sometimes be considered as a two-dimensional vector, and other times as a complex number, as there terms may be used interchangeably. The so-called additive signal characteristics of the Z portion of RGB-Z systems that acquire brightness and depth data gives rise to this vector or complex characteristic of the Z pixel response.

The present method preferably uses the linear additive properties of certain types of Z TOF pixels to accurately compute the Z depth. The Canesta-type TOF systems employ such Z pixels, as do systems produced by others. Assuming, then, the presence of Z pixels with the desired linear additive signal properties, it follows that:

$$R(P^Z_j) = \sum_{P^{RGB}_i \in RGB(P^Z_j)} R(P^{RGB}_i) \quad (4)$$

Equation (4) means that the response of a Z pixel is the sum of the responses of the associated RGB pixels.

Figure 3C:
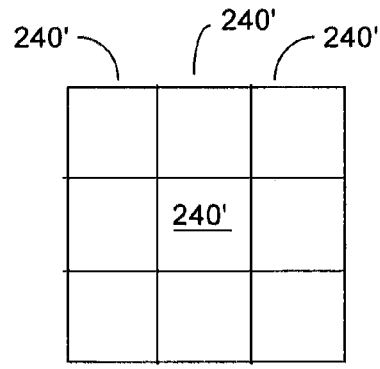

FIG. 7A depicts a single large area Z pixel, associated with nine smaller RGB pixels, somewhat similar to what was shown in FIG. 3C, where the large Z-pixel detects amplitude and phase signals, and thus has additive signal characteristics. In FIG. 7A, the right-hand portion of the figure is foreground, shown as five shaded RGB pixels, while the left-hand portion of the figure is background, shown as four non-shaded RGB pixels. It is understood that the area occupied, e.g., the FOV, by the nine RGB pixels $RGB(P^Z_i)$ shown corresponds approximately to a single Z pixel $P^Z_i$. FIG. 7B is a vector plot of detected phase and amplitude signals, where the Z-pixel response vector $V_{Zi}$ equals the sum of the foreground and background RGB response vectors. More specifically, the sum of the four responses from the background RGB pixels is shown as $V_{background}$ and the sum of the sum of the five responses from the foreground RGB pixels is shown as $V_{foreground}$. If $V_Z$ is the response of $P^Z_j$, then $V_Z = V_{background} + V_{foreground}$.

RGB pixels associated with a same object or plane are generally assumed to have no discontinuities in the associated depth data, as the surface of these objects is assumed to be relatively smooth, at least at the pixel granularity level. Thus the present invention deems it reasonable to add a spatial smoothness cost function to minimize Z roughness such that that local gradients are minimized. Let the standard gradient operator $\nabla$ be used, and assumed to be applied in the spatial domain, i.e., X and Y domain. Thus the cost preferably can be expressed by $$\min_{P^{RGB}_i \in Plane_i} \nabla^2 R(P^{RGB}_i).$$

This expression means that within a Z plane, e.g., a foreground or background plane, the present invention minimizes any variations in the RGB response vector over all the RGB pixels in that plane. This operation may be performed for each Z plane.

Figure 4A:
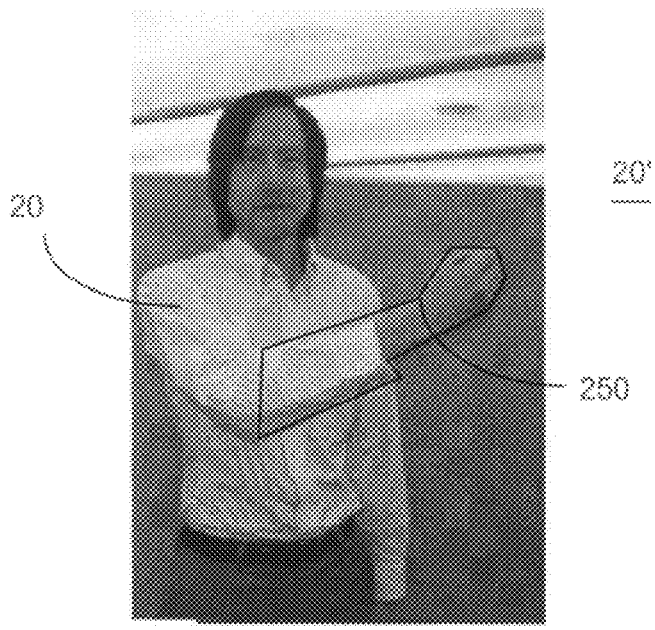
FIG. 4A is a grayscale version of a foreground subject, as acquired by an RGB-Z range finding system, with which the present invention may be practiced.
Figure 4B:
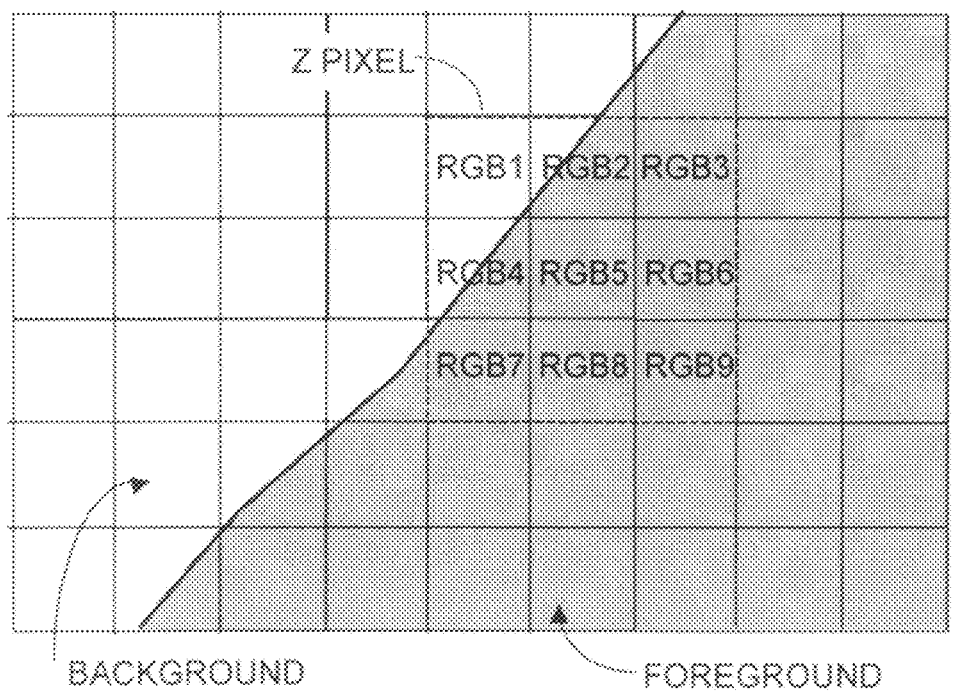
FIG. 4B depicts a portion of the foreground subject of FIG. 4A, shown in detail at a Z pixel resolution.

Referring again to the RGB image of FIG. 4A, a heavy line is drawn about a portion of the subject's right forearm to denote an example of discontinuities in Z within RGB pixels for the same object. Thus there is a segmentation boundary between a pixel on the foreground arm and an adjacent pixel on the background body. A large discontinuity in Z along that boundary is present, sufficiently large so as not to be minimized by the smoothness cost constraint. Note that in this example the subject's body and the arm are connected and could (especially for some body arm configurations) be considered as part of the same plane, even though there is a discontinuity in depth between the RGB pixels in this same plane.

Let $\check{\nabla}$ be the gradient operator $\nabla$ except that it is zero on all segmentation boundaries. The correct cost function to be minimized taking into account all segmentation boundaries is then $$\min_{P^{RGB}_i \in Plane_i} \check{\nabla}^2 R(P^{RGB}_i).$$

Since this minimization operation is performed on all planes and the gradient operator $\check{\nabla}$ will automatically be zero between planes there is no need to distinguish between planes. Thus, the minimization process over the entire image can be written as $\min \check{\nabla}^2 R(P^{RGB}_i)$.

In summary the two constraints that preferably govern an up-sampling method according to an embodiment of the present invention are an additive constraint:

$$R(P^Z_j) = \sum_{P^{RGB}_i \in RGB(P^Z_j)} R(P^{RGB}_i)$$

and a smoothness cost constraint: $\min \check{\nabla}^2 R(P^{RGB}_i)$. The present invention recognizes that successful up-sampling is equivalent to solving these two constraints albeit to varying degrees of accuracy and with different algorithms.

Note that in practice the exact minimum of the smoothness cost function need not be computed and it may suffice for a merely reasonably approximation to the minimization step for the smoothness equation to be achieved. Furthermore the smoothness cost constraint can be written in a number of different ways, and the above smoothness cost constraint equation is just one possible representation. Other representations may arise from a form of low pass filtering of the response $R(P^{RGB}_i)$ of the RGB pixels. Preferably all such operations assume that whenever there is a choice of interpretation, the data that produces the smooth surfaces (except at segmentation boundaries) will preferably be chosen. Thus the general formulation of the problem is to minimize the smoothness cost constraint subject to the additive constraint. Various solutions and various trade-offs exist for meeting these constrains, including without limitation gradient search quadratic minimization.

The formulation of the smoothness cost constraint states that the variations in RGB pixel response are minimized. However an underlying physical constraint is that the surface of the solid objects in the field of view be smooth. Thus the distance (except at segmentation boundaries) should be smoothly varying. Recall that the response $R(P^{RGB}_i)$ Of a pixel $P^{RGB}_i$ is a two-dimensional vector that can be treated as a complex number. The phase $R_\phi(P^{RGB}_i)$ of this complex number (i.e. the angle when the complex number is represented in polar coordinates) is indicative of the distance and should be captured in a smoothness cost constraint. The magnitude $R_M(P^{RGB}_i)$ of this complex number (i.e. the magnitude when the complex number is represented in polar coordinates) is indicative of the brightness and need not necessarily be captured in a smoothness cost constraint because even smooth objects may have a rapidly varying pattern.

The smoothness constraint may then be split up into a phase part and a magnitude part as follows:

Phase smoothness min $\check{\nabla}^2 R(P^{RGB}_i)$
Magnitude smoothness min $\check{\nabla}^2 R_M(P^{RGB}_i)$ If information on the magnitude is available it may replace or augment the smoothness cost constraint. However if no additional information for the magnitude is available, then a smoothness cost constraint on the magnitude may be warranted. Thus, if information as to the magnitude of the response is known, the information should be used. Otherwise, application of the smoothness constraint is used to fill in magnitude values.

In general a mixed cost function in terms of both phase and magnitude may be used where the importance of the phase smoothness is given a different weight than the magnitude smoothness as in:

$\min(K_1 \check{\nabla}^2 R_\phi(P^{RGB}_i) + K_2 \check{\nabla}^2 R_M(P^{RGB}_i))$ where $K_1$ and $K_2$ are weights.

The additive constraint and the smoothness cost constraint in one of its many incarnations contain the information to recover an accurate Z depth value at each RGB pixel. These constraints may be solved in a variety of ways and to varying degrees of optimality. Furthermore depending on the input conditions some of the constraints may be skipped because they may be implicitly assumed and/or partially satisfied by the solution method.

Some exemplary methods to solve the above equations will now be described. Some of these methods yield approximate solutions but have lower run times, whereas other methods might be more optimal but require greater computational overhead.

FIG. 7C depicts three side-by-side Z pixels and associated twenty-seven smaller RGB pixels. The left and right Z pixels image only background regions of the target object, respectively background 1 and background 2, whereas the center pixel has four RGB pixels in the foreground and five RGB pixels in either background 1 or background 2. The present invention first employs segmentation to establish segmentation boundaries between foreground and background regions. The left and right Z pixels on background 1 and background 2 have no segmentation boundaries within the Z-pixel and thus have correct Z values for these two backgrounds. According to an aspect of the present invention, it is reasonable to assign RGB pixels for the left Z pixel a depth value of background 1, and to assign RGB pixels for the right Z pixel a depth value of background 2.

Alternatively, the method may be understood as follows. Each RGB pixel for the left Z pixel was given a response of $R_Z/9$ (where $R_Z$ is the response of the left Z pixel), and each RGB pixel for the right Z pixel was given a response of $R_Z/9$ (where $R_Z$ is the response of the right Z pixel). This is a form of smoothness cost constraint where all the RGB pixels within a Z pixel get the same response or alternately same depth value (or phase value, since knowledge of phase yields knowledge of Z.

In FIG. 7C, the center Z pixel has two segmentation boundaries, and the RGB pixels for that Z pixel belong to three different Z planes, e.g., background 1, foreground, background 2. The light gray shaded RGB pixels in the center Z pixel belong to the same background 1 plane as the RGB pixels of the left Z pixel and may be given the same response or phase. Similarly, the darker gray shaded RGB pixels of the center Z pixel belong to the same background 2 plane as the RGB pixels of the right Z pixel and may be given the same response or phase. So doing invokes another smoothness assumption. The present invention now invokes the additive constraint to obtain the response of the foreground RGB pixel associated with the center Z pixel. In this case the constraint is:

$R(P^Z_{center}) = 2R(P^{RGB}_{background1}) + 4R(P^{RGB}_{foreground}) + 3R(P^{RGB}_{background}) = 2/9R(P^Z_{left}) + 4R(P^{RGB}_{foreground}) + 3/9R(P^Z_{right})$ $R(P^{RGB}_{foreground}) = 1/4R(P^Z_{center}) - 2/18R(P^Z_{left}) - 1/12R(P^Z_{right})$ The above is but another invocation of a form of smoothness because it was assumed that all foreground RGB pixels have the same response (or phase). It is understood that other more accurate but slower executing methods may also be used to solve the system of equations.

Other methods may be used to minimize the additive constraints and the cost constraints, including for example, various methods for minimizing a cost function subject to constraints. Such methods may include gradient searches that take into account forbidden regions created by the constraints. Since the constraints are linear, modified linear programming methods that search the solution space from vertex to vertex may be used. Such methods would of course be modified to deal with the nonlinear cost constraints. Simulated annealing methods may also be used if computation time permits. Further, modified variants of quadratic cost minimization techniques such as those used in CAD tools, e.g., quadratic cost-based placement and route tools, may also be used.

A description of extending the smoothness cost constraint to the time domain will now be given. Just as spatial smoothness is a reasonable assumption to make for solid objects, temporal smoothness is a reasonable assumption to make as well because solid objects generally cannot change direction or speed rapidly from image capture to capture. Thus a gradient operator in the time domain may also be introduced into the cost.

A given RGB pixel $P^{RGB}_j$ may be observing a background, from image captures $C_0$-$C_i$ a foreground from captures $C_{i+1}$-$C_j$ and then a background$_2$ from captures $C_{j+1}$-$C_z$. The segmentation boundaries for pixel PRGBj in the time domain are then between captures $C_i$ and $C_{i+1}$ and between captures $C_j$ and $C_{j+1}$. One may then invoke a smoothness cost constraint in the time domain. For that a time gradient operator is introduced, for example the standard gradient operator $\check{V}$, which like the spatial gradient operator $\check{V}$ is zero at the time segmentation boundaries. Each capture retains all of its additive constraints but in addition there may be a time based smoothness cost constraint to be satisfied namely $$\min \check{V}_t^2 R(P_i^{RGB})$$

Of course the various minimization constraints such as space and time may compete with each other and appropriate weights and priorities must be assed to each of these cost functions. The cost function may then be combined into one equation.

$$\min \check{V}_{xyt}^2 R(P_i^{RGB})$$ where the gradient operator $\check{V}_{xyt}$ now operates simultaneously on space and time and has appropriate weightings between the domains. If desired, $\check{V}_{xyt}$ can be extended to differentiate between phase and magnitude by introducing $\check{V}_{\phi xyt}$ and $\check{V}_{Mxyt}$ in a fashion similar to $\check{V}_\phi$ and $\check{V}_M$.

Up-sampling may operated solely in the Z domain as will now be described. The up-sampling methods described herein find application in addition to increasing the XY resolution of the Z data acquired by a low resolution Z sensor. Up-sampling may also be used to improve the quality of Z data acquired by a Z sensor, even when no RGB sensor is present, thanks to the smoothing cost constraint. Because of the noise properties of the signal received at each pixel, the depth reading Z has a jitter or uncertainty that is related to the amount of signal received. The greater the signal the lower the uncertainty.

Aggregating or averaging the signal over several pixels reduces the noise because the equivalent signal is larger. Similarly the signal for a single pixel can be aggregated or averaged over time with an equivalent effect. If $\sigma_i$ is the uncertainty of a collection of depth readings then $$1/\sigma^2 = \sum_i 1/\sigma_i^2$$

is usually the uncertainty of the averaged data. The smoothing cost constraint is similar to an averaging mechanism in that data from neighboring pixels or from different captures in time may be considered as averaged to remove jagged highs and lows in the depth/response reading. Thus the up-sampling algorithms may be used to improve data taken by a Z camera. The up-sampling method in this case proceeds as if the RGB pixels are the same as the Z pixels.

Figure 8A:
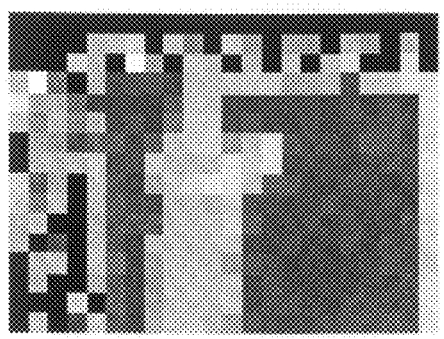
FIG. 8A represents a Z-image of a person with the right forearm held before his chest, as acquired by an array of 64×64 pixels.
Figure 8B:
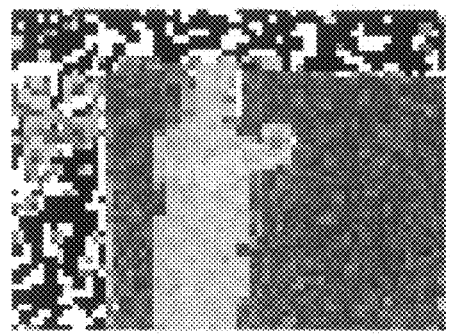
FIG. 8B represents a Z-image of the person imaged in FIG. 8A, as acquired by an array of 160×160 pixels.

FIGS. 8A-8F are useful in appreciating enhanced imaging achieved by system 100" as shown in FIG. 5, according to segmenting and up-sampling embodiments of the present invention. FIG. 8A represents a Z-image of person depicted in the grayscale image shown in FIG. 4A, with the right forearm held before his chest. This image represents acquisition using an array of 64×64 Z-pixels. The depth image shown in FIG. 8A is simply too crude in granularity to be useful for many applications, video games, for example. By contrast, FIG. 8B represents a Z-image of same person, however acquired by an array of 160×160 Z-pixels. Clearly the higher Z-resolution evidence by FIG. 8B is beneficial. For example a game application might readily recognize the forearm gesture of the subject from the Z-image of FIG. 8B, whereas the image of FIG. 8A may simply be too crude. However in some applications, the native 64×64 Z-resolution associated with FIG. 8A may be all that is available.

Figure 8C:
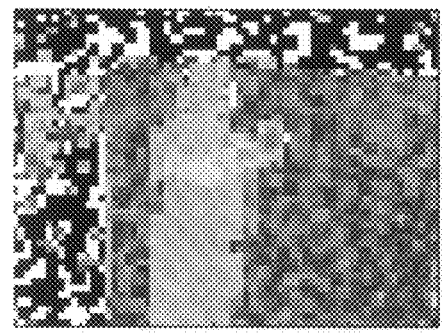
FIG. 8C represents a Z-image of the person imaged in FIG. 8A, as acquired by an array of 120×160 pixels.
Figure 8D:
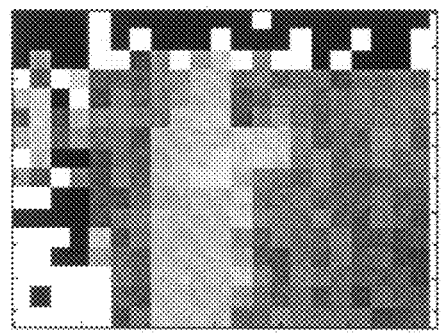
FIG. 8D represents a Z-image of the person imaged in FIG. 8A, down-sampled from data acquired during creation of the Z-image of FIG. 8C to synthesize acquisition with an array of 64×64 pixels.
Figure 8E:
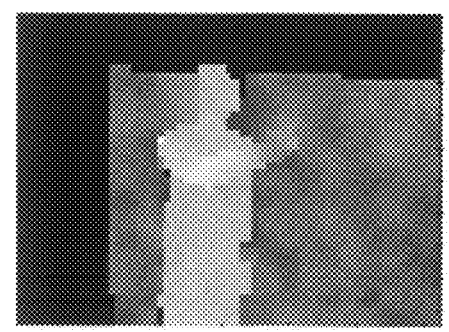
FIG. 8E represents a Z-image of the person imaged in FIG. 8A, up-sampled from data acquired during creation of the Z-image of FIG. 8D using segmentation depicted in FIG. 8F, according to an embodiment of the present invention.
Figure 8F:
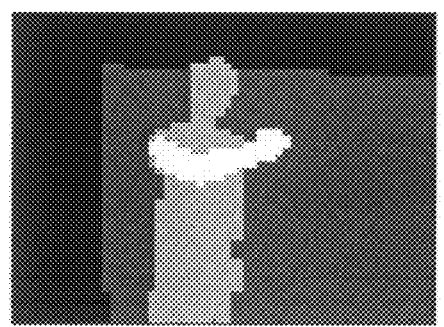
FIG. 8F represents segmentation used for up-sampling the Z-image depicted in FIG. 8C, according to an embodiment of the present invention.

FIG. 8C is a Z-image of the same person imaged, now imaged with a 120×160 Z-pixel array. in FIG. 8A, as acquired by an array of 120×160 pixels. The relatively good Z-resolution depicted in FIG. 8C will be used as a reference in describing FIGS. 8D-8F. FIG. 8D was created by down-sampling the Z data depicted in FIG. 8C, simply because assignee Canesta, Inc. did not have Z-sensors with 64×64 pixel resolution. In an experiment, the poor 64×64 pixel resolution Z data used to create FIG. 8D was used to create the rather good appear up-sampled image shown in FIG. 8E, using segmenting acquired from the RGB image shown in FIG. 8F. Comparing the relatively good Z image shown in FIG. 8E with the relatively poor Z image shown in FIG. 8D, it is hard to believe that data from the later image were used to create FIG. 8E, using up-sampling and segmentation, according to embodiments of the present invention. Thus it will be appreciated that for a given Z pixel resolution, embodiments of the present invention can produce enhanced Z-images that are superior to what would normally be creating from the low Z resolution data acquired. Thus, lower cost, lower resolution Z arrays can be used in applications otherwise calling for more expensive, greater resolution Z arrays.

While the present invention can use higher quality RGB data to enhance Z images, aspects of the present invention can enable higher quality Z images to be creating using only Z-acquired data, e.g., without also using RGB data. Similarly, RGB images can be enhanced using Z-acquired data, and in some instances using only RGB acquired data.

Modifications and variations may be made to the disclosed embodiments without departing from the subject and spirit of the present invention as defined by the following claims.

What is claimed is:

1. A method to increase resolution of a Z image for an RGB-Z imaging system useable to image a scene, which RGB-Z imaging system has an RGB array of RGB pixels to acquire RGB data useable to form an RGB image, and has a Z array of Z-pixels having additive signal properties to acquire Z data useable to form a Z-image, the method including the following steps:

(a) acquiring said RGB data from said RGB array and acquiring said Z data from said Z array such that at least one RGB pixel in said RGB array corresponds to and is associated with at least one Z pixel in said Z array;

(b) determining from Z data acquired at step (a) where Z discontinuities occur in said Z array, and for determined said Z discontinuities in said Z array, identifying from RGB data acquired at step (a) corresponding RGB pixels at which said Z discontinuities occur; and (c) applying determinations and identifications from step (b) to compute a solution to a set of constraints and to minimize a set of costs to determine a correct Z value for said at least one said RGB pixel corresponding to said Z pixel; wherein a resultant Z-image exhibits enhanced resolution compared to native Z resolution of a Z image produced from said Z array.

2. The method of claim 1, wherein at step (c), said set of constraints utilizes said additive signal properties of said Z pixels.

3. The method of claim 1, wherein at step (c), said additive signal properties of said Z pixels are satisfied by providing said Z pixel array with Z pixels for which a Z pixel response is the sum of responses of associated RGB pixels.

4. The method of claim 1, wherein applying said determinations and identifications from step (b) to minimize said set of costs includes minimizing said set of costs to render Z data at each RGB pixel so as to smooth at least a portion of a surface of an object within said scene imaged by said RGB-Z system and displayed on said resultant image.

5. The method of claim 1, wherein step (b) locates said Z discontinuities using at least one of (i) Z-pixel acquired active brightness discontinuity data, (ii) Z-gradient data, and (iii) RGB pixel data.

6. The method of claim 1, wherein:
said RGB-Z system is disposed in a motor vehicle, said scene is external to said motor vehicle, which scene may include an object hazardous to said motor vehicle.

7. The method of claim 1, wherein determining Z discontinuities at step (a) includes using a priori technique by which alpha values are assigned to regions of said scene.

8. The method of claim 1, wherein at step (c), said set of constraints includes a linear additive constraint and a smoothness cost constraint.

9. The method of claim 8, said smoothness cost constraint is satisfied by minimizing object surface discontinuities.

10. A method to identify discontinuities in Z in an RGB image for an RGB-Z imaging system useable to image a scene, which RGB-Z imaging system has an RGB array of RGB pixels to acquire RGB data useable to form an RGB image, and has a Z array of Z-pixels having additive signal properties to acquire Z data useable to form a Z-image, the method including the steps of:
  (a) determining where Z discontinuities occur in said Z array;
  (b) acquiring said RGB data and said Z data such that at least one RGB pixel corresponds to and is associated with at least one Z pixel in said Z array at which said Z discontinuities occur;
  (c) using said RGB data to determine where Z discontinuities occur in RGB pixels neighboring said at least one RGB pixel;
  wherein discontinuities identifiable in a Z image are now identifiable in an RGB image.

11. The method of claim 10, further including using a confidence map for Z depth values to reduce errors in determination of Z discontinuities at step (c).

12. The method of claim 11, wherein data from Z pixels associated with a low confidence is not used.

13. A method to identify discontinuities in Z in an RGB image for an RGB-Z imaging system useable to image a scene, which RGB-Z imaging system has an RGB array of RGB pixels to acquire RGB data useable to form an RGB image, and has a Z array of Z-pixels having additive signal properties to acquire Z data useable to form a Z-image, the method including the steps of:
  (a) determining where Z discontinuities occur in said Z array;
  (b) acquiring said RGB data and said Z data such that at least one RGB pixel corresponds to and is associated with at least one Z pixel in said Z array at which said Z discontinuities occur;
  (c) using said RGB data to determine where Z discontinuities occur in RGB pixels neighboring said at least one RGB pixel, wherein at step (c) discontinuities in Z are identified using vector-disparity between RGB values;
  wherein discontinuities identifiable in a Z image are now identifiable in an RGB image.

14. The method of claim 13, wherein at step (c), vector-disparity between RGB values is augmented to include a fourth dimension Z depth estimate for said RGB pixels.

15. A method to replace RGB data in an RGB image formed by an RGB-Z imaging system useable to image a scene, which RGB-Z imaging system has an RGB array of RGB pixels to acquire RGB data useable to form an RGB image, and has a Z array of Z-pixels having additive signal properties to acquire Z data useable to form a Z-image, the method including the steps of:
  (a) determining at least one location whereat Z discontinuity occurs in said RGB array of RGB pixels such that at least a first RGB pixel neighboring said Z discontinuity is on one side of said Z discontinuity, and at least a second RGB pixel neighboring said Z discontinuity is on a second said of said Z discontinuity;
  (b) replacing a value of said at least said first RGB pixel;
  (c) leaving unchanged a value of said at least second RGB pixel;
  wherein said Z discontinuity delineates foreground from background within an RGB image formed by said RGB-Z system, wherein one of said foreground and background is substituted at step (b).

16. The method of claim 15, wherein value replacement for said first RGB pixel at step (b) depends at least in part upon a previous value of said first RGB pixel.

* * * * *